(12) United States Patent
Bowyer

(10) Patent No.: US 10,717,176 B1
(45) Date of Patent: Jul. 21, 2020

(54) HANGER PIN REMOVAL TOOL

(71) Applicant: Gerald L. Bowyer, Park Hills, MO (US)

(72) Inventor: Gerald L. Bowyer, Park Hills, MO (US)

(*) Notice: Subject to any disclaimer, the term of this patent is extended or adjusted under 35 U.S.C. 154(b) by 161 days.

(21) Appl. No.: 15/946,476

(22) Filed: Apr. 5, 2018

(51) Int. Cl.
*B25B 27/02* (2006.01)
*C03B 9/30* (2006.01)

(52) U.S. Cl.
CPC .............. *B25B 27/023* (2013.01); *C03B 9/30* (2013.01)

(58) Field of Classification Search
CPC ... B25B 27/0071; B25B 27/22; B25B 27/023; B25B 27/062; B25B 27/08; B25B 27/20; B25C 11/00; Y10T 29/49822; Y10T 29/53848; Y10T 29/53883; Y10T 29/53887
See application file for complete search history.

(56) References Cited

U.S. PATENT DOCUMENTS

| | | | |
|---|---|---|---|
| 1,510,866 A * | 10/1924 | Seppmann | B25B 27/06 29/275 |
| 1,873,294 A * | 8/1932 | Cosgrove | B25B 27/02 29/254 |
| 1,887,994 A | 11/1932 | Conner et al. | |
| 2,133,697 A * | 10/1938 | Birkelund | B25B 27/24 29/214 |
| 3,099,876 A * | 8/1963 | Lawless | B25B 27/04 29/229 |
| 3,200,484 A * | 8/1965 | Garman | B25B 27/023 29/263 |
| 3,584,365 A * | 6/1971 | Cuen et al. | B25B 27/023 29/256 |
| 4,432,125 A | 2/1984 | Monteleone et al. | |
| 4,627,141 A | 12/1986 | Teske | |
| 4,798,106 A * | 1/1989 | Foster | B67B 7/066 81/3.29 |
| 5,033,180 A * | 7/1991 | Colson | B25B 27/062 29/259 |
| 5,163,519 A * | 11/1992 | Mead | B25B 27/026 173/135 |
| 5,327,631 A * | 7/1994 | Lincavage | B25B 27/04 279/46.2 |
| 6,526,641 B1 * | 3/2003 | Latham | B25B 27/026 254/18 |
| 6,601,277 B1 * | 8/2003 | Swanson | B25B 27/023 29/256 |
| 6,910,252 B2 * | 6/2005 | Draggie | B21J 15/50 254/18 |
| 8,256,081 B2 * | 9/2012 | Fridman | B25B 27/062 29/244 |
| 2009/0236572 A1 * | 9/2009 | Laun | B25C 11/02 254/18 |

(Continued)

*Primary Examiner* — Tyrone V Hall, Jr.
(74) *Attorney, Agent, or Firm* — Cramer Patent & Design, PLLC; Aaron R. Cramer

(57) ABSTRACT

A hanger pin removal tool has a first tubular body having a cut-out at a distal end thereof with a second tubular body slidably secured therewithin. The second tubular body has a channel and port cut within the first tubular body which is aligned with the cut-out of the first tubular body. The tool is configured to permit insertion into the mouth of a recently manufactured glass bottle, secure to the hanger pin positioned within the bottle and extract the same.

16 Claims, 4 Drawing Sheets

(56) References Cited

U.S. PATENT DOCUMENTS

2012/0301291 A1\* 11/2012 Spanos .................. F01D 5/005
                                                          415/214.1
2014/0345100 A1\* 11/2014 Huang .................. B25B 27/023
                                                          29/264

\* cited by examiner

HANGER PIN REMOVAL TOOL

RELATED APPLICATIONS

Not applicable.

FIELD OF THE INVENTION

The present invention relates generally to the field of a removal tool for a hanger pin of a bottle molding machine.

BACKGROUND OF THE INVENTION

As anyone who performs a lot of mechanical work will attest, nothing beats having the proper tool for a job. The proper tool can save time, save money, produce a higher quality job, reduce damage to equipment, and provide for the increased safety of the worker. Each field of mechanical work has its own type of specialty tools, each performing a specialized task. One (1) field where there has been a need for such a specialized tool is in the removal of molding hangers on glass bottle molding machines. Such hangers are held in place with pins. Unfortunately, these hangers run in extremely hot conditions and often seize up in the hanger.

Current methods of removal are extremely time consuming as well as posing a risk of damage to the pin, the hanger, or the molding machine itself. Accordingly, there is a need for a means by which retaining pins used on molding hangers used on glass bottle molding machines can be easily removed without the disadvantages as described above. The development of the mold hanger pin removal tool fulfills this need.

SUMMARY OF THE INVENTION

To achieve the above and other objectives, the present invention provides for such a pin removal tool, including a sleeve having a first end and a second end and an insert slidably connecting within an interior of the sleeve, further having an insert first end and an insert second end. The insert is configured to receive a first nut. The insert is configured to engage with a bolt head of a molding pin hanger. The insert is configured to permit travel of a threaded rod therethrough to adjustably engage with the first nut. The sleeve second end is configured to permit travel of the threaded rod therethrough. The sleeve is configured to resist passage of the bolt head with the insert when it insert travels relative to the sleeve.

To achieve the above and other objectives, the present invention provides for such a pin removal tool, including a sleeve having a first end and a second end an insert slidably connecting within an interior of the sleeve, further having an insert first end and an insert second end, a first nut residing within the insert, and a threaded rod adjustably attached to the first nut adjacent a first rod end and adjustably attached to the sleeve second end adjacent a rod second end. The insert is configured to receive a first nut. The insert is configured to engage with a bolt head of a molding pin hanger. The insert is configured to permit travel of a threaded rod therethrough to adjustably engage with the first nut. The sleeve second end is configured to permit travel of the threaded rod therethrough. The sleeve is configured to resist passage of the bolt head with the insert when it insert travels relative to the sleeve.

It is therefore an object of the present invention to provide such a sleeve to include a slot extending inwardly along a side of the sleeve from the sleeve first end, a cap affixed to and covering the sleeve second end, a cap aperture, and a key located on an inner surface thereof. The key interacts with the insert to prevent rotational movement of the insert relative to the sleeve. The cap aperture is configured to permit travel of the threaded rod therethrough. In at least one (1) embodiment, the slot terminates in an elongated opening on either side of a longitudinal bisecting centerline, sized to permit insertion of the bolt head therethrough. The slot is sized to restrict passage of the bolt head when the insert travels relative to the insert.

It is an object of the present invention to provide such an insert to include a band circumscribed and recessed along the insert adjacent the insert first end, a first bore section having a first bore diameter extending inwardly from the insert second end with a first bore length, a second bore section having a second bore diameter extending inwardly from the first bore section and having a second bore length, a third bore section having a third bore diameter extending inwardly from the first bore section and having a third bore length, an access slot located on a first side of the sleeve located at a transition between the second and third bore section and in fluid communication therewith, a guide slot extending inwardly along a second side of the insert from said insert first end, and a bolt head capture slot located within the band. The guide slot engages a key feature within the sleeve to prevent rotational movement of the insert relative to the sleeve. The access slot is configured to receive the first nut. The first bore section, second bore section, and third bore section are configured to permit travel of the threaded rod therethrough. In certain embodiments, a roll pin located within the access slot is capable of engaging the first nut.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
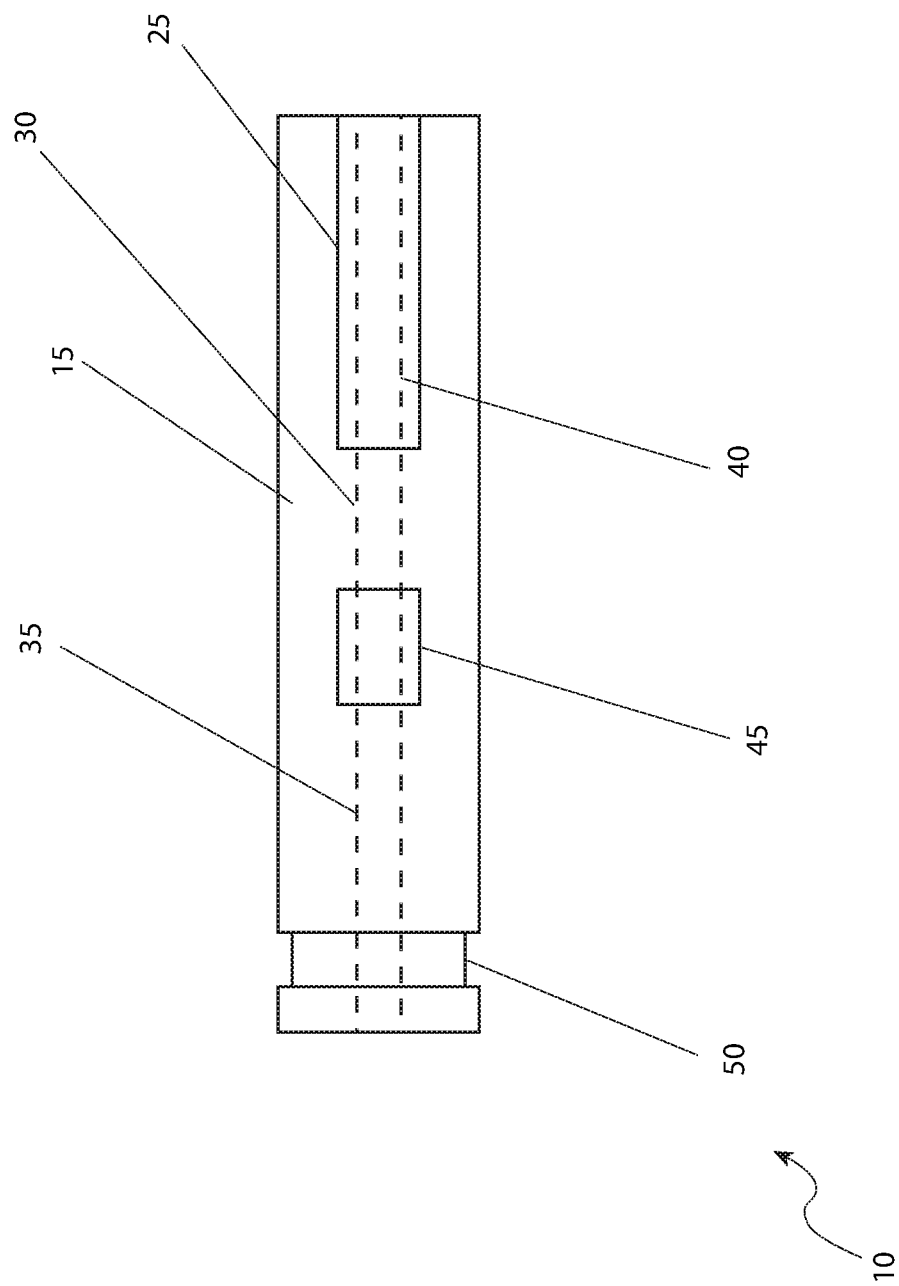
FIG. 1 is a front view of the movable insert 15 as used with the mold hanger pin removal tool 10, according to the preferred embodiment of the present invention.

10 mold hanger pin removal tool
15 movable insert
20 outer sleeve
25 first bore section
30 second bore section
35 third bore section
40 guide slot
45 access opening
50 recessed band
55 first nut
60 threaded rod 65 roll pin
70 bolt head capture slot
75 side slot
80 elongated opening
85 welded cap
90 second nut
95 withdrawal travel path
100 key
105 molding hanger pin
110 bolt

DETAILED DESCRIPTION OF THE
PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIG. 1, a front view of the movable insert 15 as used with the mold hanger pin removal tool 10, according to the preferred embodiment of the present invention is disclosed. The mold hanger pin removal tool 10 (herein also described as the "tool") 10, is comprised of two (2) major components, the movable insert 15 and the outer sleeve 20 (not shown in this FIGURE). The outer sleeve 20 will be described in greater detail herein below).

The movable insert 15 is generally cylindrical in state with the approximate dimension of five and three-eighths inches (5⅜ in.) in length and one and three-eighths inches (1⅜ in.) in diameter. It is envisioned to be made of tool grade steel such as chromium-vanadium alloy or similar material. It is provided with three different bore sections. A first bore section 25 is approximately two inches (2 in.) in length and five-eighths inch (⅝ in.) diameter. A second bore section 30, directly adjacent to the first bore section 25 is approximately one-half inch (½ in.) in length and one-half inch (½ in.) in diameter. The remainder of the movable insert 15 is then provided with a third bore section 35 that is approximately five-sixteenths inch (5/16 in.) in diameter. A guide slot 40 (here shown by hidden lines due to illustrative limitations) is provided on the opposite side of the movable insert 15. This guide slot 40 continues for the entire length of the movable insert 15. An access opening 45 is provided at the junction of the second bore section 30 and the third bore section 35, whose functionality will be described herein below. The movable insert 15 is provided with a recessed band 50 that extends around the entire perimeter of the movable insert 15.

Figure 2:
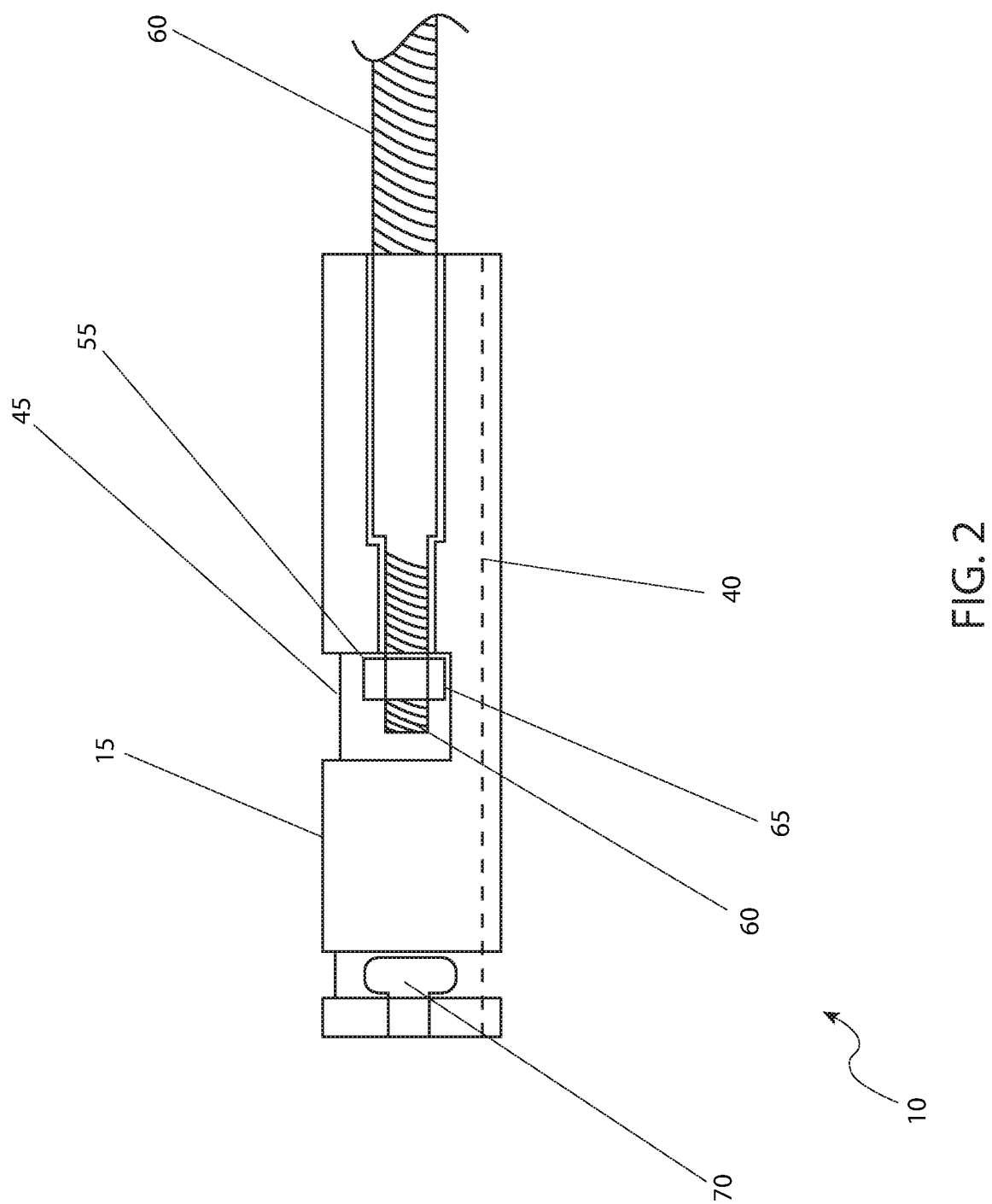
FIG. 2 is a side view of the movable insert 15, as used with the mold hanger pin removal tool 10, according to the preferred embodiment of the present invention.

Referring next to FIG. 2, a side view of the movable insert 15, as used with the mold tool 10, according to the preferred embodiment of the present invention is depicted. This figure is arranged at an approximate angle of ninety degrees (90°) when compared to the view offered in FIG. 1. The access opening 45 is now visible on the upper side of the movable insert 15. The access opening 45 is used to secure a first nut 55 upon a threaded rod 60. The threaded rod 60 is approximately twenty inches (20 in.) in length and five-eighths inch (⅝ in.) in diameter. The left-hand end is reduced in size to approximately one-half inch (½ in.) in diameter and is secured in place by the first nut 55 which is in turn secured by a roll pin 65 to prevent inadvertent disengagement. This arrangement of the threaded rod 60 within the movable insert 15 allows it to freely rotate but does not allow for linear separation. The guide slot 40 is on the lower edge of the movable insert 15, arranged at one hundred eighty degrees (180°) to the centerline of the access opening 45. The left-hand side of the movable insert 15 is provided with a bolt head capture slot 70. The bolt head capture slot 70 is used to retain a standard five-sixteenth (5/16) bolt 110 that is inserted into the top of the molding hanger pin 105 used on a bottle molding machine. This bolt head capture slot 70 is simply slid over the head of the bolt 110 from the side and is capable of holding and exerting force upon the head of the bolt 110 to aid in extraction without damage to the molding hanger pin 105, the molding machine, nor the present invention itself.

Figure 3:
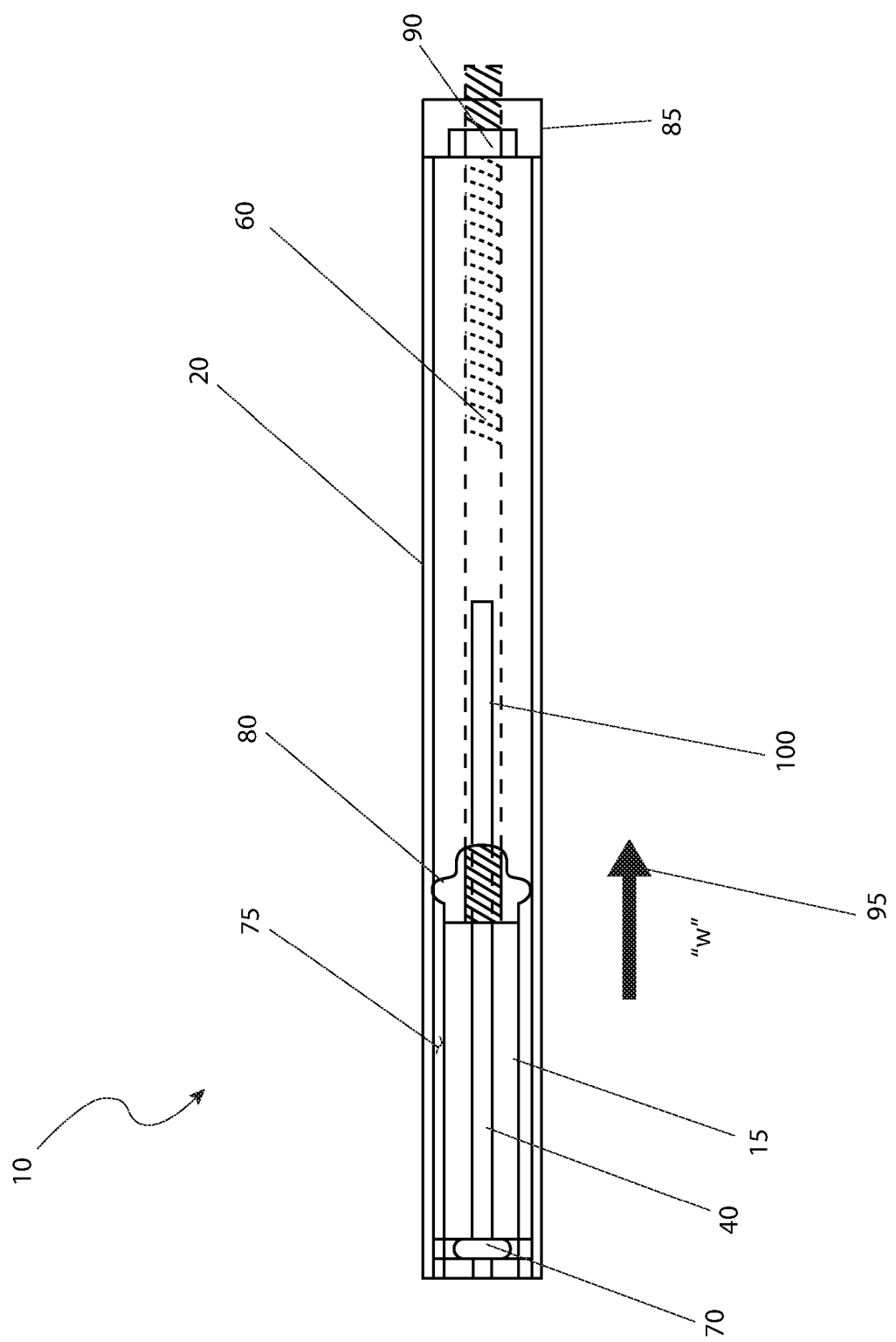
FIG. 3 is a side view of the of the mold hanger pin removal tool 10, as shown in initial state prior to utilization, according to the preferred embodiment of the present invention; and, FIG. 4 is a side view of the mold hanger pin removal tool 10, as shown in a final state after utilization, according to the preferred embodiment of the present invention.

Referring now to FIG. 3, a side view of the tool 10, as shown in initial state prior to utilization, according to the preferred embodiment of the present invention is shown. The movable insert 15 is shown installed inside of the outer sleeve 20. The outer sleeve 20 is of a hollow tube design, made of steel that is approximately one-and-a-half inches (1½ in.) in diameter and approximately twenty-six and three-quarters inches (26¾ in.) in length. The left-hand side of the outer sleeve 20 is provided with a side slot 75 that occupies the first six and three-quarters inches (6¾ in.) with an elongated opening 80 at its interior boundary. During use, the bolt head capture slot 70 becomes in alignment with the elongated opening 80, as will be described in further detail herein below.

The right end of the outer sleeve 20 is provided with a welded cap 85 for structural reinforcement. The threaded rod 60 extends through the welded cap 85 whereupon a second nut 90 is installed. Thus, as the second nut 90 is tightened, the movable insert 15 is pulled through the outer sleeve 20 along a withdrawal travel path 95. The movable insert 15 is prevented from rotational movement within the outer sleeve 20 via a key 100 which is permanently fastened to the outer sleeve 20 and rides in the guide slot 40 of the movable insert 15. During use of the tool 10, the user installs a bolt 110 (typically a five-sixteenth (5/16) bolt) in the top of the molding pin 105 holding the molding hanger in place. It is noted that the pins are predrilled and tapped to accept the bolt 110. Next, with the tool 10 in the configuration as shown in FIG. 3, the bolt head capture slot 70 is simply slipped over the bolt head. Then by using a ratcheting socket or an air ratchet, the second nut 90 is tightened. This action pulls the movable insert 15 along the withdrawal travel path 95, while the outer sleeve 20 remains braced against the surface of the molding machine. This tightening action is stopped when the bolt head capture slot 70 reaches the same location as the elongated opening 80.

Figure 4:
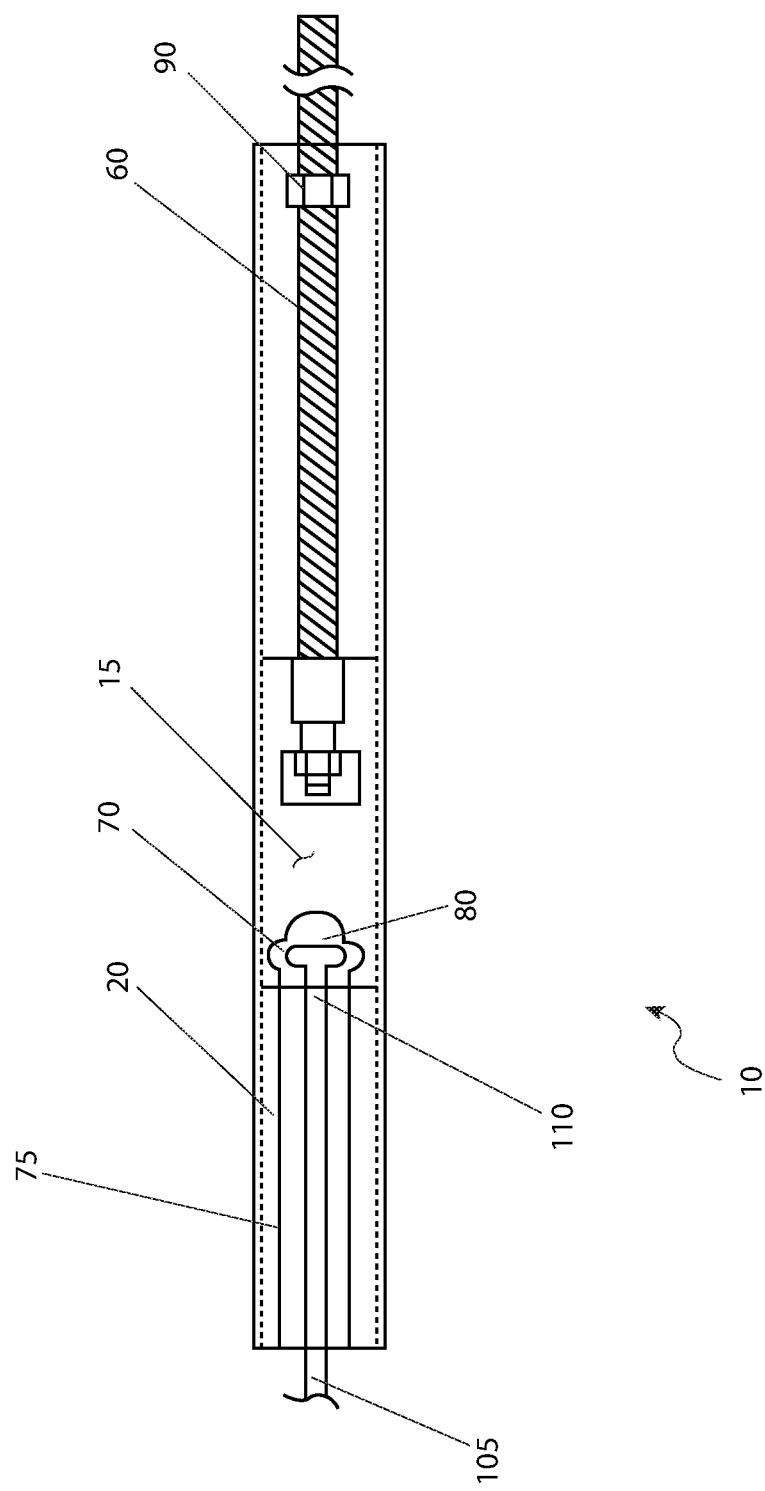

Referring finally to FIG. 4, a side view of the tool 10, as shown in a final state after utilization, according to the preferred embodiment of the present invention is disclosed. A molding hanger pin 105 with a bolt 110 installed, is shown attached to the tool 10 via the bolt head capture slot 70. As such, the molding hanger pin 105 is extracted as the movable insert 15 is pulled into the outer sleeve 20 via the tightening of the threaded rod 60 within the outer sleeve 20 by the second nut 90. This extraction can be used on molding hanger pin 105 up to approximately seven inches (7 in.) long. It is noted that shorter molding hanger pin 105 may also be removed at any point along the side slot 75 without the full extraction as shown in FIG. 4.

The preferred embodiment of the present invention can be utilized by the common user in a simple and effortless manner with little or no training. It is envisioned that the tool 10 would be constructed in general accordance with FIG. 1 through FIG. 4. The user would procure the tool 10 through convention tool procurement channels. A tool 10 produced in accordance to aforementioned dimensions could be used in most situations, although alternate dimensions could be utilized to fit other pin removal applications. Configurations of the tool 10 with alternate dimension should not be interpreted as a limiting factor of the present invention.

After procurement and during utilization, the tool 10 would be used in the following manner: the movable insert 15 would be positioned within the outer sleeve 20 as shown in FIG. 3; a bolt 110 is placed in the molding hanger pin 105 that is stuck in position; the bolt head capture slot 70 is slid over the bolt 110 from the side; the second nut 90 within the welded cap 85 is tightened with a socket ratchet, air-operated tool or the like. This action pulls the movable insert 15, and thus the molding hanger pin 105, into the outer sleeve 20 and ensuring that molding hanger pin 105 is safely removed. At this point in time, the bolt 110 and the molding hanger pin 105 is slid sideways from the movable insert 15 and through the side slot 75 and elongated opening 80 as well.

After use of the tool 10, the rotation of the second nut 90 is reversed; the movable insert 15 is driven back to the initial position as shown in FIG. 3, thus preparing for use of the tool 10 in repeating manner on other molding hanger pins 105 as needed.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A removal tool, comprising:
 a sleeve, having a first end and a second end; and,
 an insert slidably connecting within an interior of said sleeve, having an insert first end and an insert second end;
 a band circumscribed and recessed along said insert adjacent said insert first end;
 a first bore section having a first bore diameter, extending inwardly from said insert second end with a first bore length;
 a second bore section having a second bore diameter, extending inwardly from said first bore section, and having a second bore length;
 a third bore section having a third bore diameter, extending inwardly from said first bore section, and having a third bore length;
 an access slot, located on a first side of said sleeve, located at a transition between said second bore section and said third bore section and in fluid communication therewith;
 a guide slot extending inwardly along a second side of said insert from said insert first end; and,
 a bolt head capture slot located within said band;
 wherein said insert is configured to receive a first nut;
 wherein said insert is configured to engage with a bolt head of a molding pin hanger;
 wherein said insert is configured to permit travel of a threaded rod therethrough to adjustably engage with said first nut;
 wherein said sleeve second end is configured to permit travel of said threaded rod therethrough;
 wherein said sleeve is configured to resist passage of said bolt head with said insert when said insert travels relative to said sleeve;
 wherein said guide slot engages a key feature within said sleeve to prevent rotational movement of said insert relative to said sleeve;
 wherein said access slot is configured to receive said first nut and,
 wherein said first bore section, said second bore section, and said third bore section is configured to permit travel of said threaded rod therethrough.

2. The removal tool of claim 1, wherein said sleeve further comprises:
 a slot extending inwardly along a side of said sleeve from said sleeve first end;
 a cap affixed to and covering said sleeve second end, having a cap aperture; and,
 a key located on an inner surface thereof;
 wherein said key movingly resides within said guide slot thereby preventing rotational movement of said insert relative to said sleeve; and,
 wherein said cap aperture is configured to permit travel of said threaded rod therethrough.

3. The removal tool of claim 2, wherein said slot terminates in an elongated opening on either side of a longitudinal bisecting centerline;
 wherein said elongated opening is sized to permit insertion of said bolt head therethrough; and,
 wherein said slot is sized to restrict passage of said bolt head when said insert travels relative to said insert.

4. The removal tool of claim 3, wherein said insert further comprises:
 a band circumscribed and recessed along said insert adjacent said insert first end;
 a first bore section having a first bore diameter, extending inwardly from said insert second end with a first bore length;
 a second bore section having a second bore diameter, extending inwardly from said first bore section, and having a second bore length;
 a third bore section having a third bore diameter, extending inwardly from said first bore section, and having a third bore length;

an access slot, located on a first side of said sleeve, located at a transition between said second bore section and said third bore section and in fluid communication therewith;
a guide slot extending inwardly along a second side of said insert from said insert first end and engaging said key; and,
a bolt head capture slot located within said band;
wherein said access slot is configured to receive said first nut; and,
wherein said first bore section, said second bore section, and said third bore section is configured to permit travel of said threaded rod therethrough.

5. The removal tool of claim 4, further comprising a roll pin located within said access slot, capable of engaging said first nut.

6. The removal tool of claim 2, wherein said insert further comprises:
a band circumscribed and recessed along said insert adjacent said insert first end;
a first bore section having a first bore diameter, extending inwardly from said insert second end with a first bore length;
a second bore section having a second bore diameter, extending inwardly from said first bore section, and having a second bore length;
a third bore section having a third bore diameter, extending inwardly from said first bore section, and having a third bore length;
an access slot, located on a first side of said sleeve, located at a transition between said second bore section and said third bore section and in fluid communication therewith;
a guide slot extending inwardly along a second side of said insert from said insert first end and engaging said key; and,
a bolt head capture slot located within said band;
wherein said access slot is configured to receive said first nut; and,
wherein said first bore section, said second bore section, and said third bore section is configured to permit travel of said threaded rod therethrough.

7. The removal tool of claim 6, further comprising a roll pin located within said access slot, capable of engaging said first nut.

8. The removal tool of claim 1, further comprising a roll pin located within said access slot, capable of engaging said first nut.

9. A removal tool, comprising:
a sleeve, having a first end and a second end;
an insert slidably connecting within an interior of said sleeve, having an insert first end and an insert second end;
a first nut, residing within said insert; and,
a threaded rod, adjustably attached to said first nut adjacent a first rod end and adjustably attached to said sleeve second end, adjacent a rod second end;
a band circumscribed and recessed along said insert adjacent said insert first end;
a first bore section having a first bore diameter, extending inwardly from said insert second end with a first bore length;
a second bore section having a second bore diameter, extending inwardly from said first bore section, and having a second bore length;
a third bore section having a third bore diameter, extending inwardly from said first bore section, and having a third bore length;
an access slot, located on a first side of said sleeve, located at a transition between said second bore section and said third bore section and in fluid communication therewith;
a guide slot extending inwardly along a second side of said insert from said insert first end and engaging said key; and,
a bolt head capture slot located within said band;
wherein said insert is configured to engage with a bolt head of a molding pin hanger;
wherein said insert and said sleeve permit travel of said threaded rod therethrough to adjustably engage with said first nut; and,
wherein said sleeve is configured to resist passage of said bolt head with said insert when said insert travels relative to said sleeve; and,
wherein said access slot is configured to receive said first nut;
wherein said first bore section, said second bore section, and said third bore section is configured to permit travel of said threaded rod therethrough.

10. The removal tool of claim 9, wherein said sleeve further comprises:
a slot extending inwardly along a side of said sleeve from said sleeve first end;
a cap affixed to and covering said sleeve second end, having a cap aperture; and,
a key located on an inner surface thereof;
wherein said key movingly resides within said slot thereby preventing rotational movement of said insert relative to said sleeve; and,
wherein said cap aperture is configured to permit travel of said threaded rod therethrough.

11. The removal tool of claim 10, wherein said slot terminates in an elongated opening on either side of a longitudinal bisecting centerline;
wherein said elongated opening is sized to permit insertion of said bolt head therethrough; and,
wherein said slot is sized to restrict passage of said bolt head when said insert travels relative to said insert.

12. The removal tool of claim 11, wherein said insert further comprises:
a band circumscribed and recessed along said insert adjacent said insert first end;
a first bore section having a first bore diameter, extending inwardly from said insert second end with a first bore length;
a second bore section having a second bore diameter, extending inwardly from said first bore section, and having a second bore length;
a third bore section having a third bore diameter, extending inwardly from said first bore section, and having a third bore length;
an access slot, located on a first side of said sleeve, located at a transition between said second bore section and said third bore section and in fluid communication therewith;
a guide slot extending inwardly along a second side of said insert from said insert first end and engaging said key; and,
a bolt head capture slot located within said band;
wherein said access slot is configured to receive said first nut; and, wherein said first bore section, said second bore section, and said third bore section is configured to permit travel of said threaded rod therethrough.

13. The removal tool of claim 12, further comprising a roll pin located within said access slot, capable of engaging said first nut.

14. The removal tool of claim 9, wherein said insert further comprises:
- a band circumscribed and recessed along said insert adjacent said insert first end;
- a first bore section having a first bore diameter, extending inwardly from said insert second end with a first bore length;
- a second bore section having a second bore diameter, extending inwardly from said first bore section, and having a second bore length;
- a third bore section having a third bore diameter, extending inwardly from said first bore section, and having a third bore length;
- an access slot, located on a first side of said sleeve, located at a transition between said second bore section and said third bore section and in fluid communication therewith;
- a guide slot extending inwardly along a second side of said insert from said insert first end; and,
- a bolt head capture slot located within said band;
- wherein said guide slot engages a key feature within said sleeve to prevent rotational movement of said insert relative to said sleeve;
- wherein said access slot is configured to receive said first nut; and,
- wherein said first bore section, said second bore section, and said third bore section is configured to permit travel of said threaded rod therethrough.

15. The removal tool of claim 14, further comprising a roll pin located within said access slot, capable of engaging said first nut.

16. The removal tool of claim 9, further comprising a roll pin located within said access slot, capable of engaging said first nut.

\* \* \* \* \*